July 3, 1951          E. P. HURD          2,559,433
COMBINED ROD HANDLE AND FISHING REEL
Filed Dec. 22, 1947          2 Sheets-Sheet 1
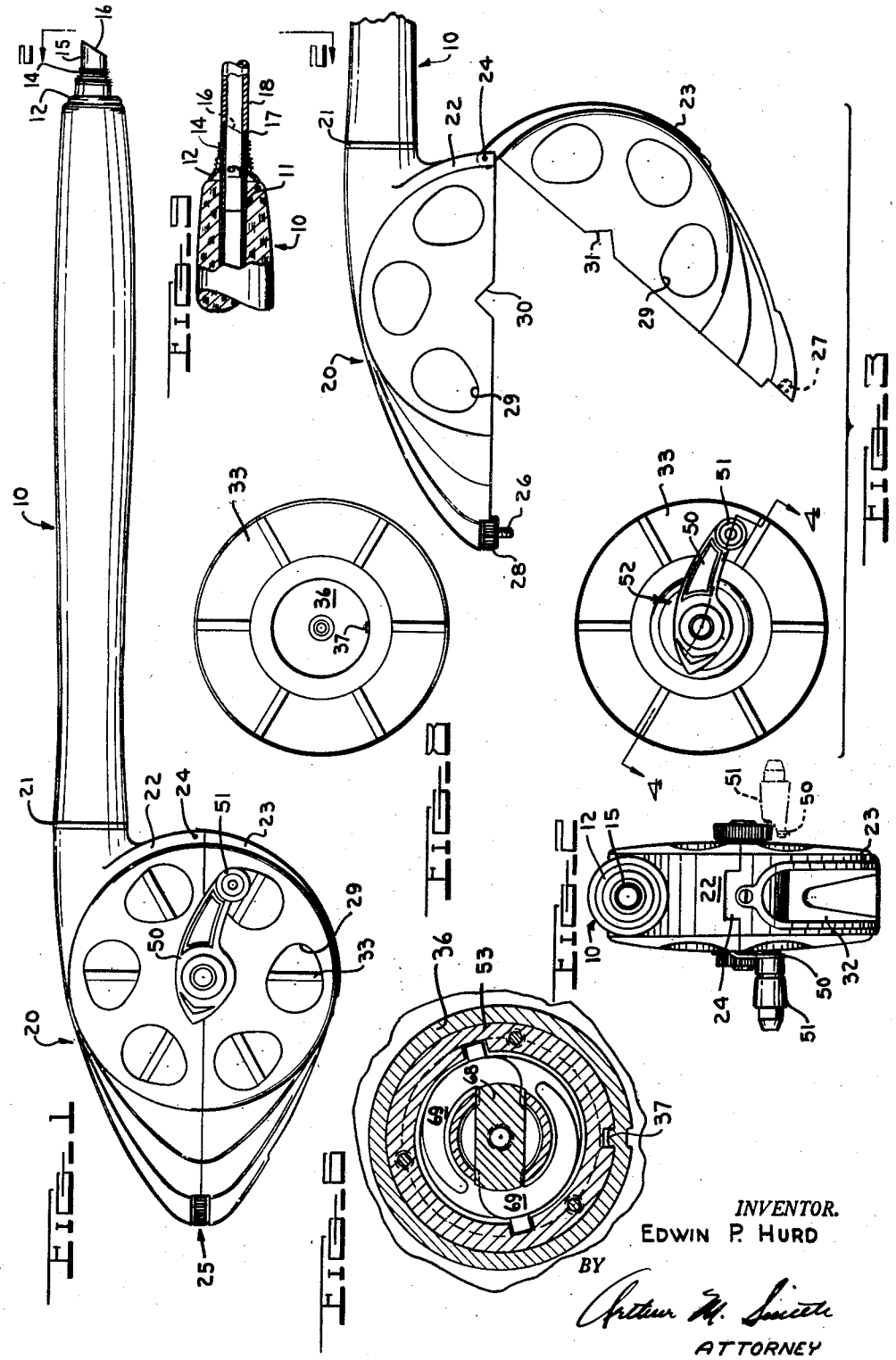
INVENTOR.
EDWIN P. HURD
BY
*Arthur M. Smith*
ATTORNEY

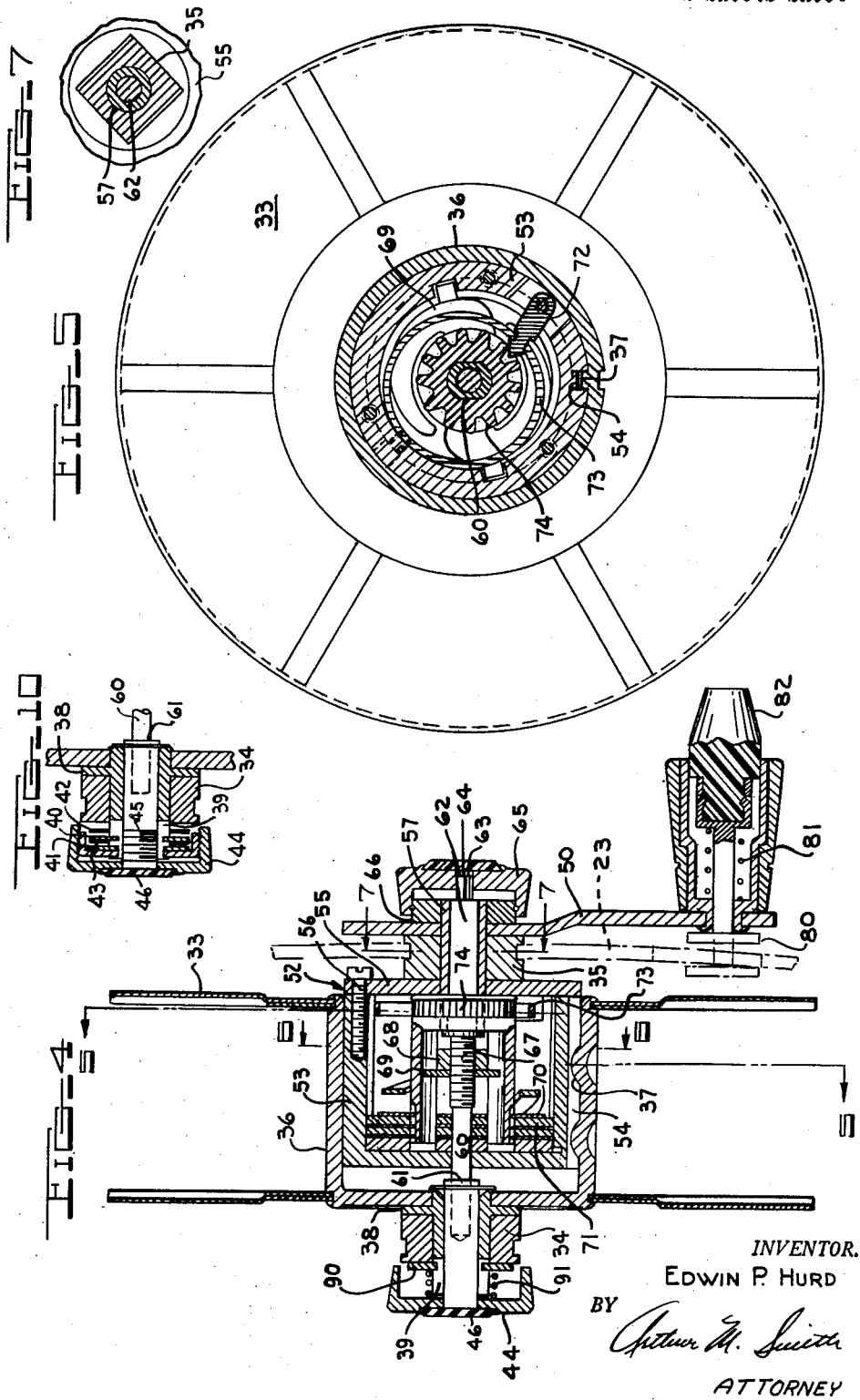

Patented July 3, 1951

2,559,433

UNITED STATES PATENT OFFICE 2,559,433

COMBINED ROD HANDLE AND FISHING REEL

Edwin P. Hurd, Detroit, Mich., assignor to Hurd Lock & Manufacturing Company, Detroit, Mich., a corporation of Michigan Application December 22, 1947, Serial No. 793,185

5 Claims. (Cl. 242—84.6)

1

The present invention relates to a combined rod handle and fishing reel and more particularly to such a combination adapted for use with fly casting rods.

In fly fishing it is common practice to use either a so-called "wet" fly or a so-called "dry" fly. The wet flies are used in those instances where it is desired to have the fly sink beneath the surface of the water while the dry fly is used in those instances where it is desired to have the fly float on the surface of the water. It is common practice among fly fishermen to use a line which is referred to as a "wet" line with the wet fly and to use a "dry" line with the dry fly.

Prior to the present invention, it has been necessary for fly fishermen, desiring to use both wet and dry flies, either to have two complete reel outfits or to carry two lines and to remove the one line and place the other line on a particular reel. Such reels, being of the detachable type, frequently became disconnected from the reel seat provided on the handle. Heretofore, little effort has been made to provide a balanced construction in a combined fly rod handle and reel with the result that the balanced "feel" of the fly rod frequently was impaired by the use of either a heavier or a lighter reel than that for which the rod and handle was intended. Since such reels are usually placed at the rear of the handle at the end opposite to the rod shaft, it will be seen that the variation in weight of different reels positioned at this point on the handle will result in appreciable differences in the balanced "feel" of the rod. This is particularly important in fly casting where balance of the rod and the skillful handling of the rod by the fly fisherman is depended upon to secure the proper cast for the particular fly being used.

Since fly fishing many times is conducted by the fisherman who is wading in the stream, it will be seen that the inconvenience of shifting from a wet line to a dry line or vice versa frequently prevents the use of the ideal type of fly. It is not uncommon that it may be desirable to change the type of flies on several occasions during a single day's fishing. Many times the fly fisherman, rather than to change reels or change lines on his reel, will attempt to use a dry line with wet flies with the result that the characteristics of the wet fly are impaired by the buoyancy

2 of the dry line and much of its effectiveness is lost.

Prior to the present invention, the reel seat and handle formed a separate unit and the reel formed another unit. These units were combined when the rod was assembled in the handle and the reel was attached to the handle. A considerable problem has been experienced by fishermen in securing a proper alignment of the line guides on the rod with the line-feed opening of the reel.

It is, therefore, an object of the present invention to provide a unitary rod and reel assembly adapted particularly for use with fly rods.

It is a further object of the present invention to provide a combined rod handle and reel which is of a balanced construction and which has a pleasing ornamental appearance in which the distribution of weight is so controlled as to provide a balanced assembly which may be used with rods of predetermined size and weight characteristics to provide an assembly which is balanced at all times and which has a uniform "feel" to the users.

It is a further object of the present invention to provide a unitary fishing rod handle and reel in which the reel spool is readily removed from the reel housing for replacement by another spool, thus permitting the fisherman to use lines of different characteristics by substituting one wound line spool for another wound line spool in the reel housing.

It is a further object of the present invention to provide a combined rod handle and fishing reel in which the line spool is removably mounted in a housing surrounding the spool and a spool driving clutch is removably connected in the hub portion of the spool.

It is a further object of the present invention to provide a fishing reel which is adapted to be connected as an integral part of the handle unit of a fishing rod and in which the line spool is removably mounted in a hinged housing which permits ready removal and replacement of the line spool, and in which a spool driving member is removably mounted in the hub thereof and a separate spool brake is connected with the spool independently of the driving means.

Other objects of this invention will appear in the following description and appended claims, reference being had to the accompanying drawings forming a part of this specification wherein like reference characters designate corresponding parts in the several views.

In the drawings:

Fig. 1 is a side elevation of the combined rod handle and fishing reel of the present invention.

Fig. 2 is an end elevation taken from the right hand end of the device as shown in Fig. 1, looking in the direction of the arrows 2—2.

Fig. 3 is an exploded fragmentary elevation showing the reel housing in the open position and the line spool and spool driving mechanism removed therefrom.

Fig. 4 is an enlarged section taken substantially on the line 4—4 in the direction of the arrows, Fig. 3.

Fig. 5 is a section taken substantially on the line 5—5 in the direction of the arrows, Fig. 4.

Fig. 6 is a section taken substantially on the line 6—6 in the direction of the arrows, Fig. 4.

Fig. 7 is a fragmentary section taken substantially on the line 7—7 in the direction of the arrows, Fig. 4.

Fig. 8 is a side elevation of a spool showing the spool prior to the insertion of the spool driving means therein and prior to the mounting of the spool in the housing.

Fig. 9 is a fragmentary view partially in section of a portion of the handle showing the rod ferrule in assembled position in the rod seat provided in the end of the handle.

Fig. 10 is a fragmentary sectional view showing a modified form of spool drag mechanism.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

As shown in the drawings, the present invention comprises a handle 10 of any desired surface configuration preferably formed of a suitable material, such as cork or the like, mounted on a tubular body member 11 (the forward end of which is shown in Fig. 9) and which extends throughout the length of the handle 10. A cap 12 is pressed over the forward end of the tubular body 11 and extends over and seals the forward end of the handle 11 and is held in place thereon by external wrapping as at 14 with silk thread or the like. The end of the body 11 terminates in a rod seat guide 15 which is provided with an angularly formed end portion 16 which mates with the complemental angularly formed end portion 17 of the fishing rod shaft 18.

The fishing rod shaft 18 is provided with a ferrule 19 which seats in the hollow end of the tubular body member 11.

The line guides (not shown) on the fishing rod shaft 18 are aligned with respect to the angularly formed end portions 16 so that when the rod shaft 18 is mounted in the handle, the rod shaft occupies a prelocated position which assures alignment of the line guides with the line opening in the reel housing.

The reel housing 20 is permanently connected with the opposite end of the tubular body member 11 and abuts against a washer 21 which seats against the end of the handle 10. The reel housing 20 comprises a fixed member 22 rigidly attached to the tubular body member 11 and a movable member 23 which is connected to the fixed member 22 by a hinge 24.

The fixed member 22 and the movable member 23 are held in closed position by a releasable lock 25, which, as shown in Fig. 3, comprises, in the preferred embodiment here shown, a dependent rotatable stud 26 carried in the fixed member 22 and having a screw-threaded male end portion adapted to seat in a screw-threaded female opening 27 in the movable member 23. A knurled shoulder 28 is provided on the dependent rotatable stud 26 and has a portion which extends outside the housing 20 to permit rotation of the stud 26 as desired, either to lock or to unlock the movable member 23 and the fixed member 22.

The reel housing 20 is provided with a plurality of vents 29 which permit ready drainage of the housing, reduces weight, and allows circulation of air through the housing. A V groove 30 is provided on the edge of the fixed member 22 and a mating V groove 31 is provided on the edge of the movable member 23. While but one side of the housing is shown in the drawings, it is to be understood that the opposite side is provided with a similar plurality of vents 29 and V grooved portions 30 and 31.

The forward edge of the movable member 23 is provided with a line opening 32 (see Fig. 2) through which the line is fed to or from the removable line spool 33. The removable line spool 33 rotates about bearings which are supported in the mating V grooves 30 and 31 by means of flat-sided bearing supporting blocks 34 and 35 (which are both formed as shown in Fig. 7). The angular arrangement of the sides of the bearing supporting blocks 34 and 35 is such that the blocks will be received and held against rotation in the mating V grooves 30 and 31 to support the spool 33 in the housing 20.

The spool 33 is provided on its one side with an enlarged hub well 36 (Fig. 8) and has an upset portion forming a key 37. On the opposite side of the spool 33 a hollow bearing shaft 38 is provided which is rotatably mounted in the flat-sided bearing supporting block 34. The bearing shaft 38 is provided with a splined end portion 39 on which is mounted a disc 90 of suitable friction material. One side of the disk 90 has a frictional contact with the surface of the bearing supporting block 34. This provides a fixed brake to prevent overrunning of the spool 33. The braking pressure is provided by the spring 91 which extends between the knob 44 and the disk 90.

If desired, the brake may be made adjustable by using the construction shown in Fig. 10. As there shown, a splined end portion 39 carries brake pressure disks 40 and 41 and friction brake disks 42 and 43. The knob 44 in this instance is screw-threaded as at 45 to the end of the hollow bearing shaft 38 and upon rotation is moved axially relative thereto either to increase or decrease the frictional contact between the disks 40 and 41 and the friction disks 42 and 43. As will be seen, the bearing block 34 held in the housing 20 against rotation will provide the necessary brake reaction member. The brake knob 44 is adjusted to thus provide a suitable braking pressure to prevent overrunning of the spool 33. The knob 44 is preferably knurled and ornamented as desired, for example, by the use of an inlaid colored jewel or plastic insert 46.

The spool 33 is rotated by means of a crank 50 having an operating knob 51. The crank 50 drives the spool 33 through an adjustable clutch drive indicated generally by the numeral 52 (Fig. 3) and shown in detail in Figs. 4 and 5. Referring to Figs. 4 and 5, the adjustable clutch drive 52 is mounted in a housing 53 which is concentrically mounted in the hub 36 and has a female slotted portion 54 which mates with the key 37 to drive the spool from the clutch housing 53. The housing 53 is generally in the form of a hollow cylinder having an open end which is closed by a removable plate 55 secured thereto by a plurality of machine screws 56 or similar fastening elements.

The removable plate 55 is journaled on a hollow drive shaft 57 which is rotatably mounted in the bearing blocks 35 and connected with the crank 50.

The housing 53 is thus free to rotate relative to the shaft 57 and the crank 50.

The clutch mechanism is mounted within the housing 53 and includes a central shaft 60 which has an end 61 extending through the housing 53. The end 61 of said shaft 60 is journaled in the hollow bearing shaft 38 mounted in the spool 33. The other end, 62, of the central shaft 60 extends through the drive shaft 57 and has an angular shank end 63 which mates in a recess 64 provided in the drag adjusting knob 65. The drag adjusting knob 65 is locked for rotation on a spacer member 66 mounted on the drive shaft 57. Rotation of the drag adjusting knob 63 rotates the shaft 60 and rotates the screw-threaded portion 67 thereof which is connected with a screw-threaded traveler nut 68 which is mounted on a flat clutch tension spring 69 which bears on the clutch plate 70 and exerts a pressure on the clutch friction lining material 71. Thus the amount of "drag" is controlled by adjustment of the knob 65 which will increase or decrease the amount of pressure exerted by the clutch tension spring 69 on the clutch plate 70 and the clutch friction lining 71 which is interposed between the clutch plate 70 and the housing 53.

A clicker mechanism is provided in the housing 53 as shown in Fig. 5. As there shown, a dog 72 is pivotally mounted on the clutch housing 53 adjacent the plate 55 and has an end portion held by a dog spring 73 in position to engage with the teeth of a ratchet wheel 74 which is mounted on the shaft 60.

The knob 51 mounted on the crank 50, as shown in Fig. 4, comprises a hollow shell in which is mounted a spring retracted detent plunger 80. The detent plunger 80 is depressed against the tension of the plunger spring 81 by the extending button 82 so as to occupy a position indicated in dotted line in this view. As here shown, the plunger 80 when depressed extends through one of the vents 29 in the housing 20, thus locking the crank 50 against rotation relative to the housing 20.

When the crank 50 is thus held against rotation, the line may be fed out from the spool 33 by exerting a sufficient force thereon to overcome the force of the spring pressed clutch member. When it is desired to rotate the spool by actuation of the crank 50, movement of the crank 50 causes the spring retracted detent plunger 80 to be withdrawn from the vent 29 and the spool is connected through the clutch mechanism for rotation by the crank 50. In the event that the force exerted on the line is greater than the amount of tension for which the clutch is adjusted, it will be seen that the spool may move relative to the crank 50. This provides an adjustable drag feature which is very important, particularly as it prevents breakage of the line, the rod, and the like—as sometimes occurs where the crank is directly connected to the spool and no provision is made for the clutching and de-clutching of the spool and the crank.

It will be seen from the foregoing that the spool may be mounted so that the crank 50 is either on the right or the left hand side of the housing as may be desired by the user. This is a feature which is appreciated by fishermen, and permits the placement of the crank and actuating knob in the desired position for either right or left hand operation.

Another advantage which is appreciated by fly fishermen using a reel of the present invention is that the handle and crank may be locked in position after the desired amount of line is pulled from the reel so that in casting of the line the crank and spool are held in fixed position in the housing so that no more than the desired amount of line is fed from the reel.

Having thus described my invention, I claim:

1. A fishing reel including a split housing, lock means for selectively locking and unlocking said housing, a removable line spool journaled in bearings held between portions of said housing when closed, spool driving means removably mounted in the hub of said spool and including a manually operable crank and an adjustable friction clutch member connected between said crank and said spool, a brake member mounted on said spool independently of said spool driving means, and a crank locking member associated with said crank for selectively locking said crank against rotation and comprising a spring detent member mounted in the handle of said crank and adapted to be manually depressed for connection with selected portions of said split housing.

2. A fishing reel comprising a split housing having a fixed member and a movable member, said fixed member being adapted to be secured at its forward end to a rod handle, said movable member being hingedly connected to said fixed member, a removable spool journaled in bearings held between the adjacent edges of the members of said housing when closed, said spool having a hub well open at its one end, a spool driving means partially enclosed by and removably mounted in said hub well and including a crank extending outwardly of said hub well and a clutch operably joining said crank and said spool, said bearings engaging opposite outer end portions of said hub well and said spool driving means whereby the spool driving means is retained in its mounted position when said housing is closed and may be removed from said hub well when said housing is opened.

3. The fishing reel as defined in claim 2 and including means extending axially through one of said bearings for adjusting said clutch.

4. The fishing reel as defined in claim 3 and further characterized in that one of said bearings is mounted on the closed end portion of said hub well and the other of said bearings is mounted on the drive shaft of said crank.

5. In a fishing reel; a spool having a hub well open at its one end; a spool driving means removably mounted in said hub well and including a crank extending outwardly of said hub well, a clutch housing, and a clutch completely enclosed by said clutch housing and operably joining said crank and clutch housing; said clutch housing being axially slidable in said hub well and connected thereto for rotation therewith; whereby said spool driving means may be readily removed from said fishing reel and maximum protection against injury is provided for said clutch.

EDWIN P. HURD.

REFERENCES CITED

The following references are of record in the file of this patent:

UNITED STATES PATENTS

| Number | Name | Date |
|---|---|---|
| 328,341 | Roberts | Oct. 13, 1885 |
| 643,538 | Ross | Feb. 13, 1900 |
| 869,474 | Atwood | Oct. 29, 1907 |
| 1,328,696 | Smith | Jan. 20, 1920 |
| 1,467,250 | Readle | Sept. 4, 1923 |
| 1,890,736 | Lenz | Dec. 13, 1932 |
| 2,299,156 | Lind | Oct. 20, 1942 |

FOREIGN PATENTS

| Number | Country | Date |
|---|---|---|
| 16,938 of 1903 | Great Britain | June 16, 1904 |
| 22,461 of 1907 | Great Britain | Oct. 1, 1908 |
| 103,216 | Australia | Feb. 24, 1938 |